(12) United States Patent
Farsoni et al.

(10) Patent No.: US 10,024,981 B2
(45) Date of Patent: Jul. 17, 2018

(54) SYSTEM AND METHOD FOR LOCATING RADIATION SOURCES

(71) Applicant: Oregon State University, Corvallis, OR (US)

(72) Inventors: Abdollah Tavakoli Farsoni, Corvallis, OR (US); Eric Matthew Becker, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 15/128,350

(22) PCT Filed: Apr. 24, 2015

(86) PCT No.: PCT/US2015/027622
§ 371 (c)(1),
(2) Date: Sep. 22, 2016

(87) PCT Pub. No.: WO2015/167967
PCT Pub. Date: Nov. 5, 2015

(65) Prior Publication Data
US 2017/0293036 A1  Oct. 12, 2017

Related U.S. Application Data

(60) Provisional application No. 61/986,560, filed on Apr. 30, 2014.

(51) Int. Cl.
*G01T 1/20* (2006.01)
*B64C 39/02* (2006.01)
*G01T 1/202* (2006.01)

(52) U.S. Cl.
CPC .......... *G01T 1/2018* (2013.01); *B64C 39/024* (2013.01); *G01T 1/202* (2013.01); *B64C 2201/12* (2013.01); *B64C 2201/141* (2013.01)

(58) Field of Classification Search
CPC ... G01T 1/11; G01T 7/00; G01T 1/366; G01S 14/931; G05D 1/0221
See application file for complete search history.

(56) References Cited

U.S. PATENT DOCUMENTS

| 2,557,158 | A | | 6/1951 | Teichmann |
| 3,020,397 | A | | 2/1962 | Pierce et al. |
| 5,324,948 | A | * | 6/1994 | Dudar ................... G01S 15/931 250/253 |
| 7,315,027 | B2 | | 1/2008 | Okada et al. |
| 7,391,028 | B1 | | 6/2008 | Rubenstein |

(Continued)

OTHER PUBLICATIONS

International Search Report and Written Opinion for PCT/US2015/027622 dated Jul. 29, 2016, 9 pages.

*Primary Examiner* — Kiho Kim
(74) *Attorney, Agent, or Firm* — Klarquist Sparkman, LLP

(57) ABSTRACT

A radiation detection system is disclosed comprising of number of detector elements arranged in a regular pattern that allows for directional information to be collected based on the number of radiation interaction events in each detection element. This system is mounted to an unmanned vehicle. In some embodiments, this information is used by the motion control unit of the unmanned vehicle to guide its movement toward a radiation source. A radiation spectrometer, also integrated in the detection system, is able to identify radiation sources.

15 Claims, 12 Drawing Sheets

(56) References Cited

U.S. PATENT DOCUMENTS

| | | | |
|---|---|---|---|
| 8,242,456 B1* | 8/2012 | Hecht | G01V 5/0075 |
| | | | 250/252.1 |
| 8,428,913 B2* | 4/2013 | Troxler | A01K 15/023 |
| | | | 250/307 |
| 2012/0043471 A1* | 2/2012 | Harpring | G01T 7/00 |
| | | | 250/394 |

* cited by examiner

SOFTWARE 1680 IMPLEMENTING DESCRIBED TECHNOLOGIES

SYSTEM AND METHOD FOR LOCATING RADIATION SOURCES

CROSS REFERENCE TO RELATED APPLICATIONS

This is the U.S. National Stage of International Application No. PCT/US2015/027622, filed Apr. 24, 2015, which was published in English under PCT Article 21(2), which in turn claims the benefit of the earlier filing date of U.S. Provisional Application No. 61/986,560, filed on Apr. 30, 2014, the contents of which is hereby incorporated herein by reference.

BACKGROUND

Finding missing and illicit radioactive material and special nuclear material (SNM) is vital to such efforts as emergency response and border security. It requires a radiation detection system that can not only identify any radioisotopes present but be able to locate the radioisotopes, which may be hidden behind other materials or obstacles. Finding and identifying radioisotopes is a critical and time-sensitive task, demanding precision and speed.

Current methods for accomplishing this task all include serious drawbacks. Hand-held detectors are typically easy to operate and provide a real-time assessment of the radiation field in the surrounding area, but require a human to enter a potentially hazardous or inaccessible area to find the source. In addition, such detectors typically do not have a directional indicator and the source must be found by carrying the detector over the suspect area a number of times and observing changes in count rate.

Portal monitors are used for scanning cargo, typically on semi-trailer trucks. These monitors typically use large sets of detectors, with some sensitive to gamma rays and some sensitive to neutrons. Typical detectors include scintillators, high-purity Germanium (HPGe), and He-3 tubes. While these monitors have high efficiency, vehicles still need to drive between them relatively slowly in order for the monitors to be able to detect any hidden material. Portal monitors are also typically large in size, demand large amounts of power, and are costly to purchase and maintain. Portal monitors are also typically used as fixed devices, making any situation that could be improved by a change in geometric configuration costly at best and impractical at worst. A typical, basic portal monitor, unable to identify sources, costs in excess of one million dollars.

Position-sensitive 3D imaging detectors can also be used to locate and identify radiation sources. These devices can give an indication of the direction and distance to a source of radiation, as well as what isotopes of radiation are present. To estimate position, these systems typically rely on a detector that can record Compton scatter interactions of gamma rays in the detector bulk and reconstruct the original position of the source. While effective, this technique is slow since a large number of events must be recorded in order to obtain an accurate estimate of the location. In addition, even hand-held versions of these devices are bulky and heavy, and must again be carried into potentially hazardous areas.

SUMMARY

A radiation detection system is disclosed comprising of number of detector elements arranged in a regular pattern that allows for directional information to be collected based on the number of radiation interaction events in each detection element. This system is mounted to an unmanned vehicle. In some embodiments, this information is used by the motion control unit of the unmanned vehicle to guide its movement toward a radiation source. A radiation spectrometer, also integrated in the detection system, is able to identify radiation sources (i.e., the radiation type).

In one or more embodiments, the unmanned vehicle is capable of flight and has the ability to hover. It is also outfitted with additional sensors that enable it to maneuver independently of any remote operator, GPS, or motion-capture system. The unmanned vehicle is additionally able to provide visual imagery of the search area corresponding to the suspected direction of the radiation source, called "First-Person View" (FPV). The system can operate autonomously, using information from a directional radiation detector to find radiation sources, inertial and proximity sensors of various types to avoid physical obstacles, and a radiation spectrometer to identify sources. The embodiments can also be used with a remote human operator. Information about source location and identity are able to be wirelessly transmitted back to a human observer. Additional advantages of this system include being able to surmount obstacles with ease, being able to easily transport the system to different sites as needed, and allowing human overseers to see the radiation source and surrounding area.

Disclosed are the embodiments of a low-cost, lightweight, low-power radiation spectrometry system with directional capability that can be used with an unmanned vehicle for autonomous detection, localization, and identification of sources of radiation. In one embodiment, multiple small, but highly-efficient radiation detection elements arranged in a regular pattern, collectively referred to as the direction-sensitive radiation detection system (DSRD), provide an indication of the direction in which a source of radiation is present by comparing the count rates among all detection elements. In this embodiment, the DSRD is affixed to an autonomous, unmanned vehicle that uses the directional information of the DSRD to move toward the source, periodically making additional directional measurements en route and avoiding intervening obstacles using various sensors on the unmanned vehicle. The multiple detection elements in the DSRD are able to articulate in a fashion that allow them to better maintain good detection efficiency with respect to the indicated source direction to ensure a minimum of time to localization. Once near the source, an energy-sensitive radiation detector (ESRD) also affixed to the autonomous, unmanned vehicle generates an energy histogram, identifies characteristic spectral features, and ultimately identifies the radioisotopes present at its location. Information about the source location and identity, including visual data, is wirelessly transmitted to human observers.

DETAILED DESCRIPTION

The following acronyms are used herein:
ADC—analog to digital converter
AO—area of operation
CDPU—central digital processing unit
DSRD—direction-sensitive radiation detector
EMI—electromagnetic interference
ESRD—energy-sensitive radiation detector
FPGA—field programmable gate array
FPV—first-person view
GPS—global positioning system
HPGe—high-purity germanium
MCU—motion control unit
SNM—special nuclear material
SSPM—solid-state photomultiplier
SiPM—silicon photomultiplier, a subset of SSPMs
PCB—printed circuit board
PMT—photomultiplier tube
UAV—unmanned aerial vehicle Disclosed herein is a device for the localization and identification of sources of radiation. The device is dependent on two principle components: a DSRD and an ESRD.

The purpose of the DSRD is to detect sources of radiation and provide information that can be used to determine the most likely direction of one or more sources of radiation. The DSRD includes multiple detection elements hereafter referred to as "panels", which are communicatively connected to a CDPU. These panels are able to articulate in a manner that increases the panels' efficiency relative to a flux of radiation emitted from a radiation source in the vicinity of the DSRD.

Figure 1:
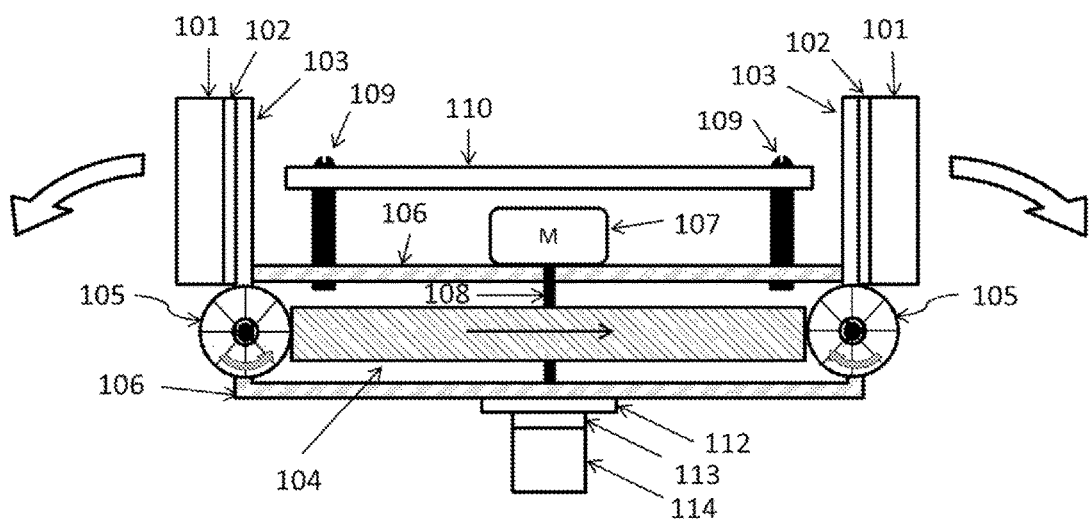
FIG. 1 shows an illustration of embodiment one of the DSRD in a cut-away view, where only a cross-section of the device is shown, at a view angle of 0°.
Figure 2:
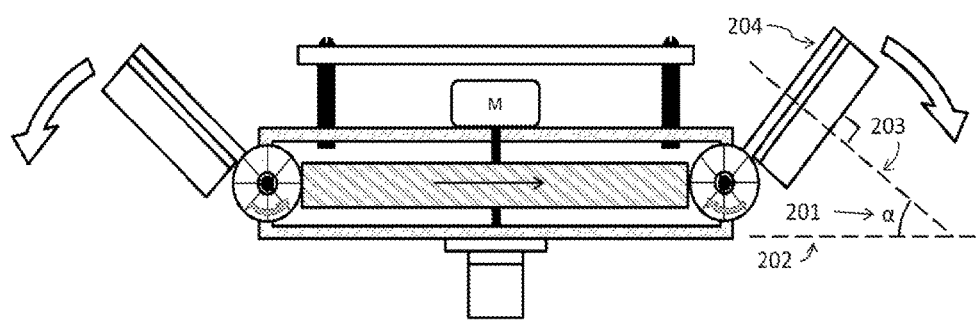
FIG. 2 shows an illustration of embodiment one of the DSRD in a cut-away view, where only a cross-section of the device is shown, at a view angle of 45°.
Figure 3:
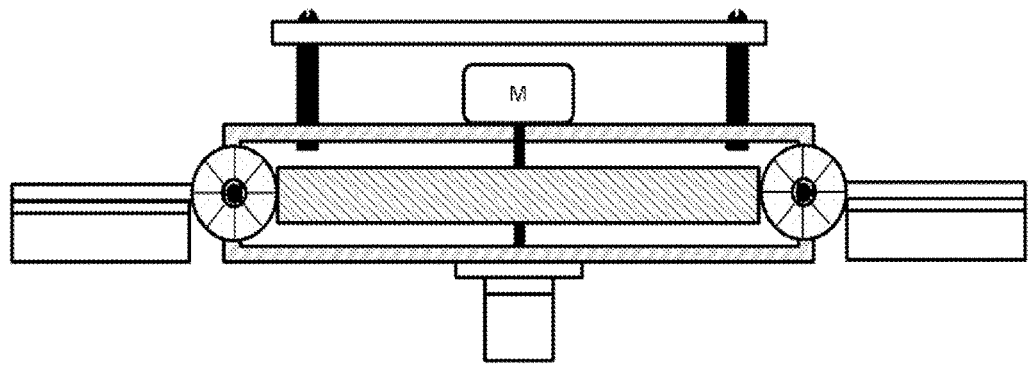
FIG. 3 shows an illustration of embodiment one of the DSRD in a cut-away view, where only a cross-section of the device is shown, at a view angle of 90°.

In one embodiment, multiple radiation detector panels are arranged in a circular pattern around a central point with substantially equidistant spacing as small as possible while still allowing room for articulation. Other patterns can be used, such as a regular pattern, a symmetric pattern, etc. Example patterns can be a square shape or any other geometric shape. Indeed, any desired number of panels and any pattern can be used. Each panel is comprised of a scintillator material 101, light-readout device 102, and readout electronics 103, described further below. Even though a scintillator material is described, any radiation detector can be used, and the embodiments are not limited to a scintillator or semiconductor. Each panel is able to articulate in a controlled fashion, as shown in FIGS. 1, 2, and 3, so as to pivot or rotate from a substantially vertical position (FIG. 1) to a substantially horizontal position (FIG. 3). The "view angle" is defined as the angle, α, 201 between the horizontal plane 202 and the plane 203 perpendicular to the front of a given DSRD panel 204. In this embodiment, the articulation of the DSRD panels is accomplished through the use of a set of helical gears, which include one central helical gear 104 and one peripheral helical gear for each panel 105 mounted on a frame 106. In this configuration, a PCB of each panel is structurally mounted to a peripheral gear, which are each able to be rotated using the central gear so as to move all of the panels in unison so that they are at the same angle. The panels and gears are arranged such that the range of the view angle is 0° to 90°. The central gear is rotated by a stepper-motor 107, either directly via driveshaft 108 or via gearbox. The central gear, peripheral gears, and stepper-motor are all structurally mounted 109 to the UAV, either directly to the airframe or via separate frame 110. The digital outputs of all DSRD panels are routed to the CDPU.

Figure 4:
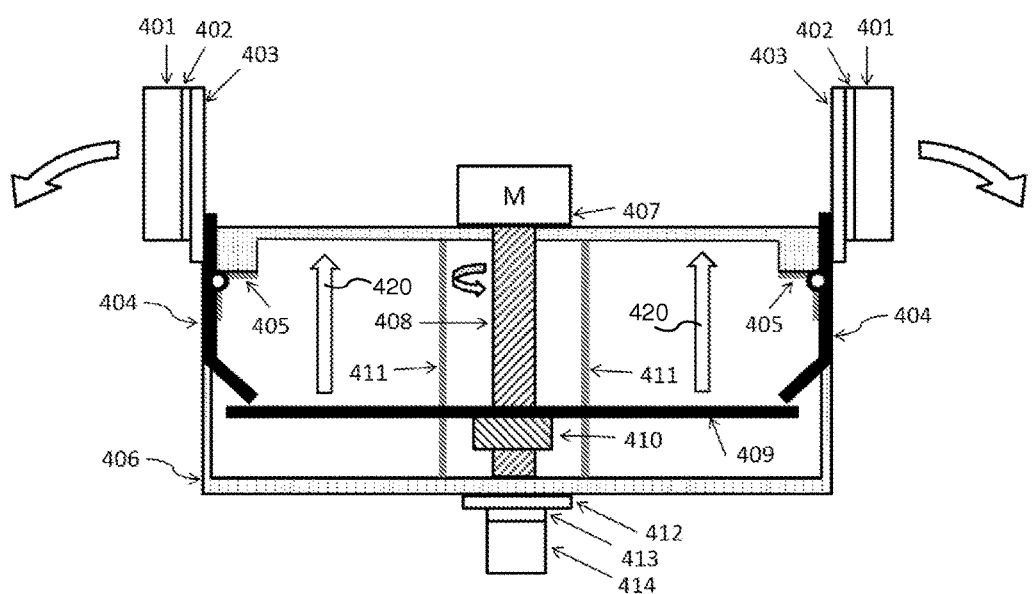
FIG. 4 shows an illustration of embodiment two of the DSRD in a cut-away view, where only a cross-section of the device is shown, at a view angle of 0°.
Figure 5:
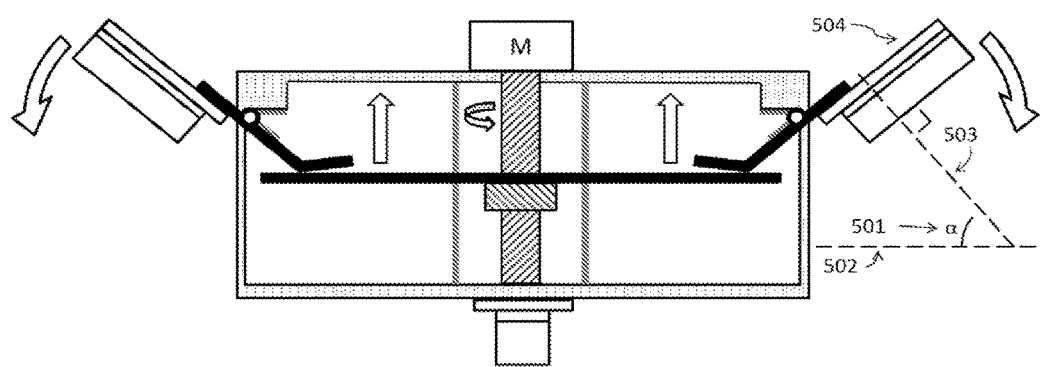
FIG. 5 shows an illustration of embodiment two of the DSRD in a cut-away view, where only a cross-section of the device is shown, at a view angle of 45°.
Figure 6:
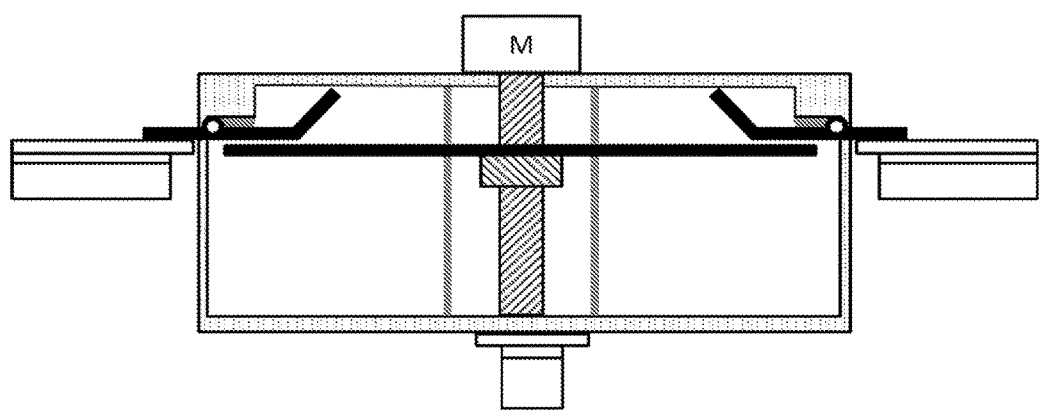
FIG. 6 shows an illustration of embodiment two of the DSRD in a cut-away view, where only a cross-section of the device is shown, at a view angle of 90°.

Another embodiment is shown in FIGS. 4, 5, and 6. This embodiment includes the same detector panels shown in FIGS. 1, 2, and 3, each panel being composed of a scintillator material 401, light-readout device 402, and readout electronics 403, with the panels being arranged in a circular pattern. In this embodiment, the articulation of the panels is accomplished via force exerted on detector panel levers. Each panel is attached to a separate lever 404 around the rotational axis of which is affixed a torsion spring 405, which is braced against the lever and the frame 406. A stepper-motor 407 rotates a central threaded rod 408. A pusher plate 409 is affixed to a nut 410 threaded around the central threaded rod. The pusher plate is made unable to rotate due to the fixed support rods 411. When the stepper-motor turns the central threaded rod in a particular direction, the nut moves the pusher plate in a direction shown by arrows 420, exerting force on the levers, and rotating the detector panels in unison. This allows the panels to achieve the same range of view angles as the embodiment in FIGS. 1, 2, and 3, where the "view angle" is defined as the angle, α, 501 between the horizontal plane 502 and the plane 503 perpendicular to the front of a given DSRD panel 504.

FIG. 6 shows the panels in the fully extended, horizontal position. When the stepper-motor turns the central threaded rod in the opposite direction, the pusher plate is lowered, and the torsion springs exert force on the levers such that the panels are articulated back to their original view angle.

The two embodiments described above, and shown in FIGS. 1-6 are examples of two different methods for articulating the detector panels in unison. Many other methods for accomplishing this articulation are possible, but are not covered herein for purposes of brevity. Any desired method for rotating the panels can be used.

Figure 7:
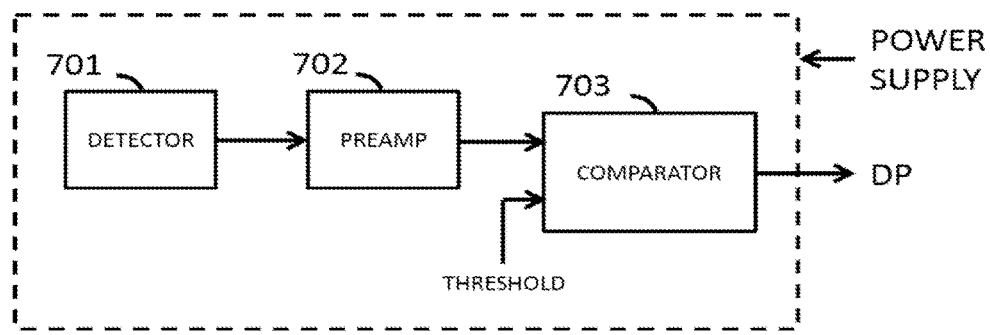
FIG. 7 shows an illustration of one embodiment of the readout electronics of a DSRD panel.

FIG. 7 is one embodiment of an electrical block diagram showing electronics associated with each panel of the DSRD. Each panel includes a radiation detector and basic readout electronics required to generate a pulse waveform.

In this embodiment, the radiation detector 701 is communicatively connected to a preamplifier 702. The preamplifier output is then communicatively connected to a comparator 703. The comparator then indicates via digital output whether, at any point in time, the voltage of the preamplifier output exceeds a user-defined threshold voltage. The comparator output DP is communicatively connected to the CDPU. Digital output from the panels is preferred to analog output since it is likely that EMI will be induced on any wires used for communication between the DSRD panels and the CDPU and digital signals are less susceptible to EMI. By detecting whether the preamplifier output voltage is above the threshold, the panels can be used to detect the presence of radiation. The output of the comparator is a series of one or more pulses. The CDPU can compare all of the DPs from the panels to see which are detecting radiation more strongly than others. Using this information, the CDPU can determine a direction of the radiation source.

Various numbers and types of radiation detectors can be used for the panels of the DSRD which are well known to those familiar with the art. The design choice will depend on the desired detection efficiency, as well as considerations of cost, weight, volume, complexity, and power. It is not required that the detector type chosen for use in the DSRD panels be capable of radiation energy spectroscopy, though detector types capable of spectroscopy may be chosen. The specific choice of detector materials used is left to the system designer, but a material with a high effective atomic number (high-Z) and high-density can be used in order to minimize the amount of time necessary to determine the source direction. Additionally, the number of panels used is a design choice that is dependent on the desired directional resolution, as well as considerations of cost, weight, volume, complexity, and power.

Each panel of the DSRD is comprised of a high-Z, high-density scintillator crystal 101, 401 optically coupled to one or more small light readout devices 102, 402 which are surface-mounted on a PCB with readout electronics 103, 403. This detector configuration is ideal for the DSRD for a number of reasons. A high-Z, high-density scintillator material is efficient for detecting x-rays and gamma rays, leading to higher count rates, and ultimately allowing for faster determination of the mostly likely direction of a radiation source. It is advantageous for the scintillator material to also be non-hygroscopic so that additional sealing and packaging for the scintillator to make it water- and air-tight, which would add weight and bulk to the panels, is not necessary. Many inorganic scintillators fit these criteria. BGO is currently a good candidate for this scintillator material since it is a high-Z, high-density material and is non-hygroscopic. Since the panels of the DSRD do not need to perform spectroscopy, the relatively poor energy resolution of BGO can be overlooked. In cases where neutron sources are expected to be present, neutron-sensitive scintillator materials may be used to gain neutron sensitivity. At present however, neutron-sensitive scintillators, such as CLLB, CLLC, and CLYC, are less efficient for x-ray and gamma ray detection than BGO and are also highly hygroscopic, and therefore not primary candidates for the DSRD panels.

The purpose of the ESRD is to identify radioisotopes that have been found using the DSRD. This device is able to use energy spectroscopy to identify the radioisotopes present very close by. The radiation detector and readout electronics can be capable of generating pulse waveforms proportional in some aspect to the amount of energy absorbed by the spectrometer from the radiation interaction. More than one radiation detector and set of readout electronics may be used in a given embodiment of the ESRD depending on considerations such as cost, weight, volume, and detection efficiency.

Figure 8:
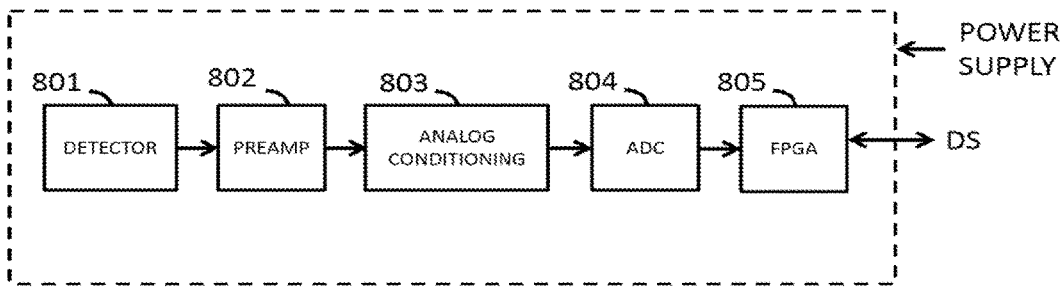
FIG. 8 shows an illustration of one embodiment of the readout electronics of the ESRD.

FIG. 8 shows an embodiment of the electronics of the ESRD. The ESRD includes a scintillator 112, 412, one or more light readout devices 113, 413, and readout electronics 114, 414. In this embodiment, the ESRD includes a radiation detector 801 communicatively connected to a preamplifier 802. The preamplifier is in turn communicatively connected to an analog conditioning circuit 803, the output of which is communicatively connected to an ADC 804. The ADC is communicatively connected to an FPGA 805. The FPGA provides a digital data bus DS, which is communicatively connected to the CDPU. The data bus DS is used to communicate control signals and data between the ESRD and CDPU. The FPGA 805 is responsible for generating the energy histogram of the radioisotopes present so as to identify a type of radiation. Although an FPGA is shown, other components can be used instead, such as a microprocessor, a DSP, etc.

Various numbers and types of radiation detectors can be used in the ESRD which are well known to those familiar with the art. The ESRD can identify the source type of the radiation, which is accomplished via radiation energy spectroscopy. The specific choice of detector materials used is left to the system designer, but the material chosen can possess adequate energy resolution to be able to accurately identify radioisotopes. The design choice also depends on considerations of cost, weight, volume, complexity and power. A scintillator material with both high-Z and high light yield is preferred as such a material affords faster and more accurate radioisotope identification. As with the DSRD panels, many inorganic scintillators fit these criteria, and CsI(Tl) is a currently a good candidate. In cases where neutron sources are expected to be present, neutron-sensitive scintillator materials, such as CLLB, CLLC, and CLYC, may be used to gain neutron sensitivity.

The light readout device for the DSRD panels and the ESRD can be small, lightweight and matches the light wavelength spectrum of the scintillator materials used in the respective detectors. The SSPM (or SiPM) is a good candidate for both detectors' light readout devices, and fills this role well compared to the more traditional PMT. SSPMs are more robust, compact, lower-power, and cost-effective when compared to PMTs. SSPMs are also insensitive to magnetic fields. Different models of SSPM are sensitive to different wavelengths of light, and are thus useable with many different scintillator materials. SSPMs can also be surface-mounted onto PCBs, further saving weight and space, and increasing durability.

Radiation detection materials and devices other than inorganic scintillators coupled to SSPMs can be used for the DSRD panels and the ESRD, and such devices and materials will be known to those in the field. However, current alternatives all have disadvantages. Organic scintillators have lower effective atomic numbers than inorganic scintillators and therefore have decreased x-ray and gamma ray efficiency. Organic scintillators also have decreased light output compared to inorganic scintillators which equates to worse energy resolution when used for the ESRD. Single-element semiconductors, such as Si and Ge, also have lower effective atomic numbers than inorganic scintillators, and are therefore also less efficient for high-energy gamma ray detection. Compound semiconductor materials, such as CdZnTe and $HgI_2$, are more expensive than inorganic scintillator materials. Gas-based detectors, such as Geiger-Mül- ler counters, are fragile and inefficient for high-energy gamma ray detection compared to inorganic scintillators.

Figure 9:
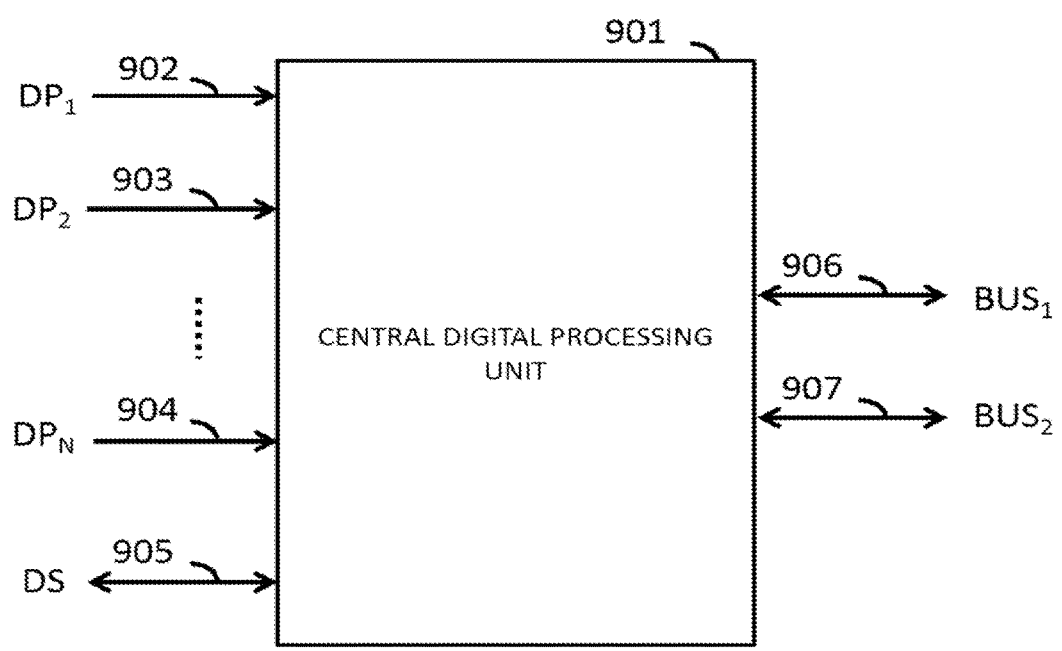
FIG. 9 shows an illustration of one embodiment of the CDPU.

The CDPU, shown in FIG. 9, processes the DSRD panel signals and the energy histogram from the ESRD, and communicates with peripheral devices. In one embodiment, the CDPU 901 possesses multiple panel inputs 902, 903, 904, an ESRD communication bus 905, and at least two peripheral data buses 906, 907. The CDPU itself can be composed of various numbers and types of processing units, such as microprocessors and FPGAs, which are known to those familiar with the art. The choice of processing unit is a choice that is left to the system designer, and will depend on considerations of complexity, speed, and power consumption.

Each of the panel inputs DP is communicatively connected to one panel of the DSRD. The CDPU communication bus DS is communicatively connected to the ESRD. The CDPU is responsible for three separate functions: tallying the number of valid signals from each of the panels, determining the most probable direction(s) of source(s), indicating when a source has been located, and identifying the unknown radioactive source(s) by analyzing the energy histogram generated on the ESRD. One of the data buses 906 is communicatively connected to a wireless transceiver. The wireless transceiver is used to transmit radiation direction, radiation energy, and identification information to a monitoring station to be accessed by human observers, and for the transmission and receiving of control signals in the case of human operation. The other data bus 907 can be communicatively connected to an unmanned vehicle's MCU. In the case of a UAV, for example, the MCU will be the flight control unit. This connection allows information from the DSRD to guide the unmanned vehicle's movement toward a source of radiation.

Any of the embodiments described herein can be used with both remote and autonomous operation of an unmanned vehicle. In a remote configuration, the direction information from the DSRD and the energy information from the ESRD are transmitted from the unmanned vehicle to a remote operator. The operator uses this information to guide the unmanned vehicle toward the radiation source. In an autonomous configuration, the unmanned vehicle decides on a direction of travel based on the directional information provided by the DSRD.

Figure 10:
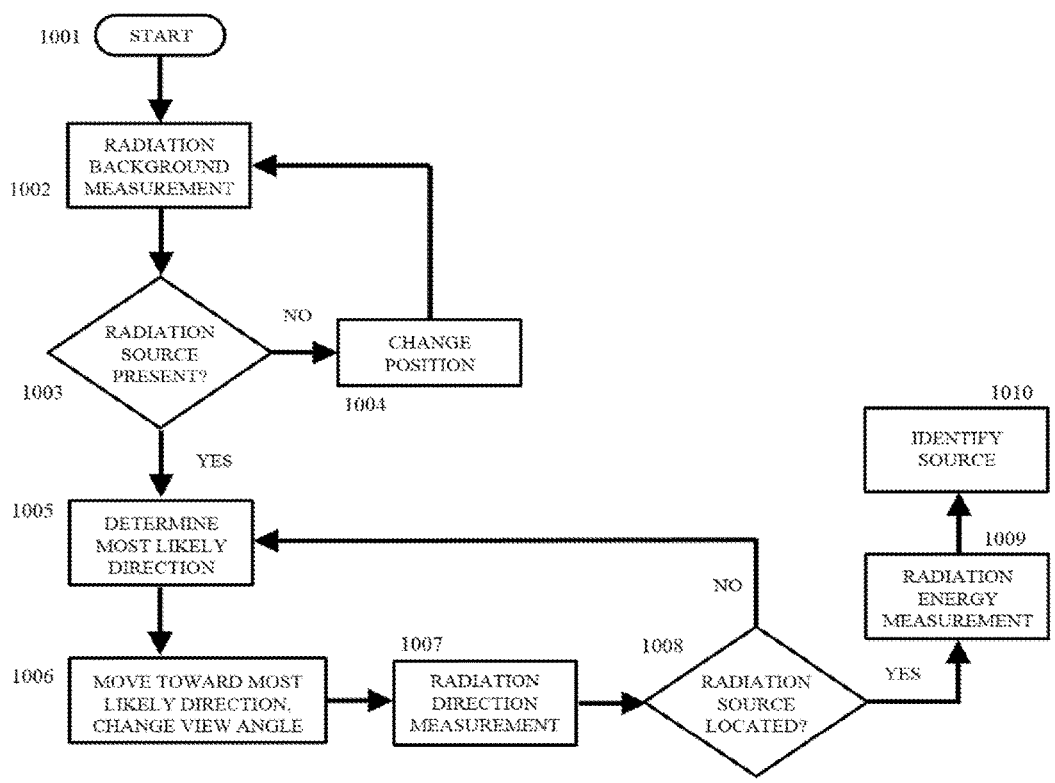
FIG. 10 shows flow chart of a typical search algorithm used to locate and identify sources using the DSRD.
Figure 11:
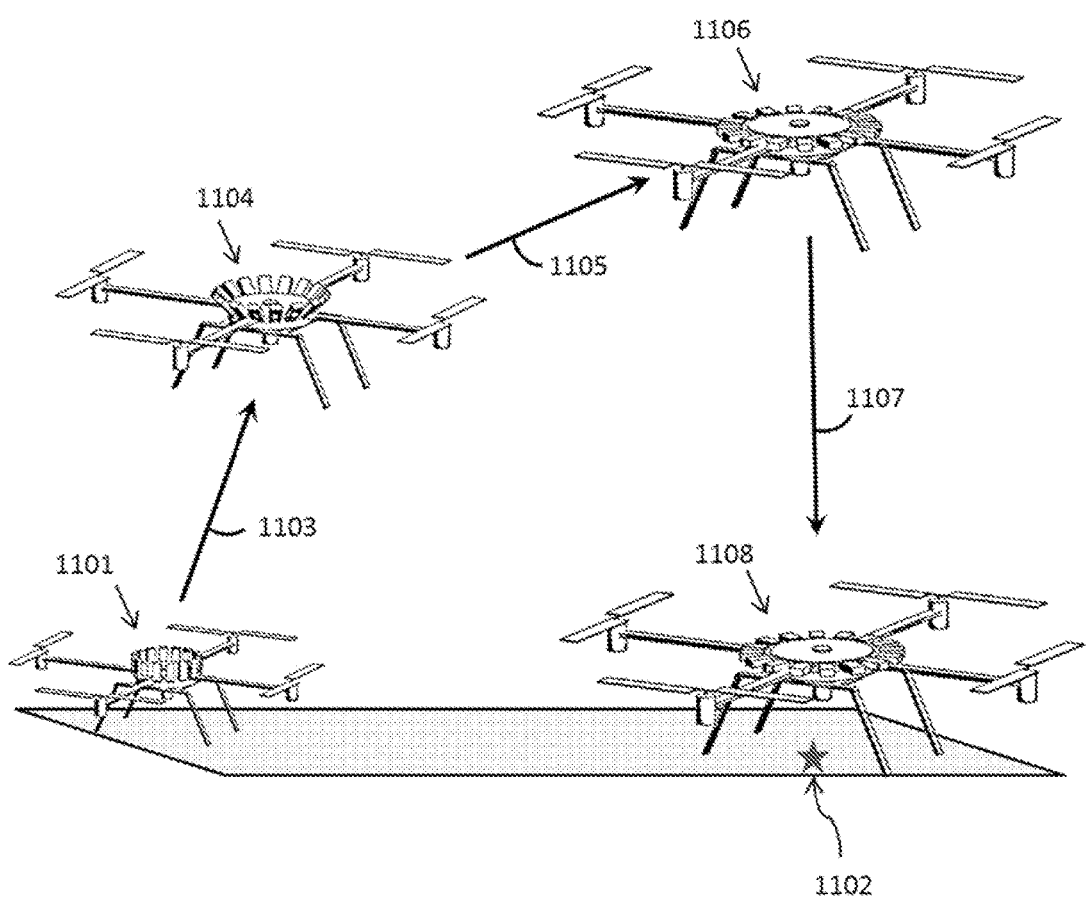
FIG. 11 shows an illustration of a typical search maneuvers employed by a UAV using information from the DSRD.

A typical and simple localization and identification process, called "solo search mode", is shown in FIG. 10. The corresponding movements of a single UAV are shown in FIG. 11. The UAV in FIG. 11 is used only as an example of one type of unmanned vehicle that can be used with the invention. The process shown in FIG. 10 can be applied to many types of unmanned vehicle.

Upon beginning the search 1001, the UAV is grounded 1101. A radiation background measurement 1002 attempts to establish whether a radiation source 1102 can be detected from the UAV's current position. If no statistically significant source can be detected 1003, the UAV changes position 1004 and repeats steps 1002 and 1003. All movements of the UAV are automated and controlled by the CDPU. This is repeated until either a source 1102 is confirmed to be present, or the search is called off. If a source is found 1003, the most likely direction of the source will be determined 1005 using information from the plurality of inputs DP1-DPN to the CDPU. For example, inputs that detect radiation can be coordinated with a position of the panel on the UAV to provide directional information. Higher count rates of a panel (when compared to other panels) indicates that the source of radiation is in the direction of that panel. The UAV will then take off and fly in the most likely direction of the radiation source 1006, 1103 while adjusting the angle of its detection panels to maintain the highest possible efficiency 1104. Once the UAV has traveled a certain distance 1105, a radiation direction measurement will be performed using the DSRD 1007 to detect whether the radiation source has been found 1008. The source is considered found when the count rate of each panel is statistically equal and above a certain background threshold. If the UAV has not located the radiation source 1008, a new most likely direction of the radiation source is established, and steps 1005, 1006, 1007, and 1008 are repeated. If the UAV has located the source 1008, the view angle of the DSRD panels is 90° and the UAV stops its lateral movement and begin to hover in place 1106. The UAV begins to descend 1107, while periodically checking whether the count rates from all panels are statistically equal. If count rates from the panels are not statistically equal, then the UAV adjusts its position in order to center itself over the source. Once the UAV has landed over the source 1108, a radiation energy measurement is performed 1009 using the ESRD, and the radioisotopes present are identified 1010.

Figure 12:
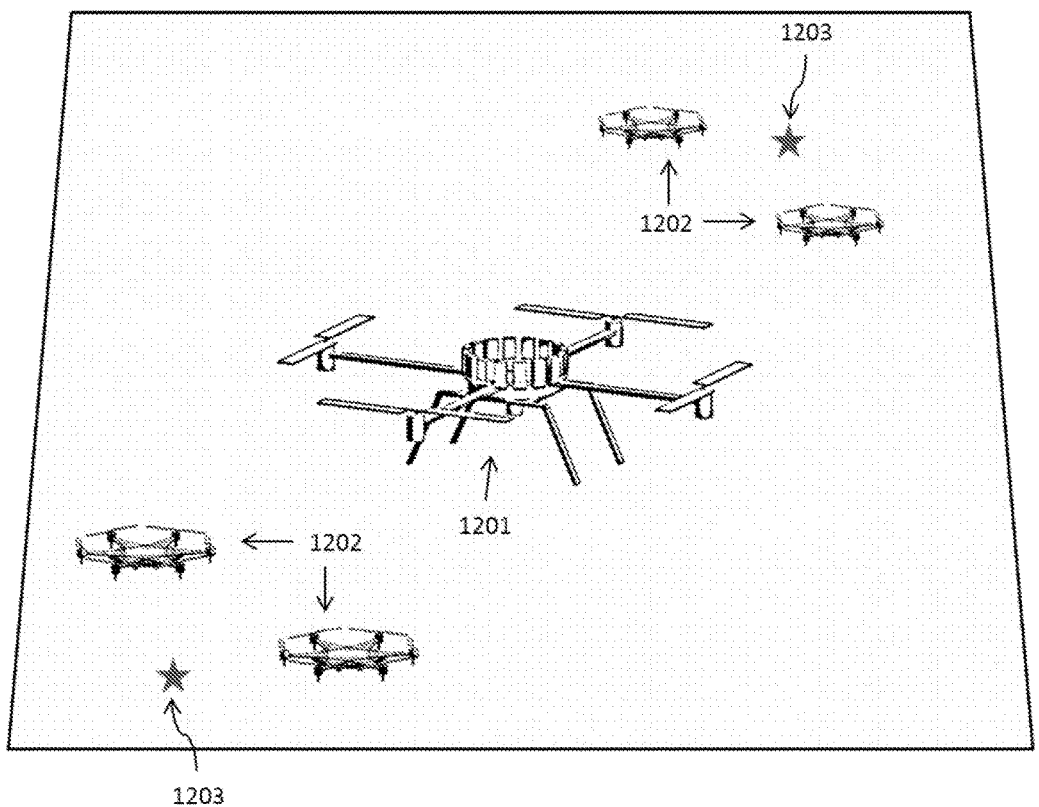
FIG. 12 shows an illustration of a typical search method employed by a group of UAVs of different types, working together to locate multiple sources.

Another process, called "team search mode", involves using more than one system to find radiation sources, shown in FIG. 12. In one embodiment, at least one UAV is a "captain" 1201, mounting a DSRD and ESRD, and at least one other UAV is a "sweeper" 1202, mounting an ESRD. In one embodiment, the captain 1201 and one or more sweepers 1202 autonomously coordinate with each other to search for and identify multiple radiation sources 1203.

The localization process involves a comparison of the count rates among all DSRD panels using the equation:

$$D_i = \frac{R_i}{\sum R_i} \qquad \text{Equation 1}$$

In Equation 1, $D_i$ is the count rate ratio of DSRD panel i, $R_i$ is the count rate of DSRD panel i, and $\Sigma R_i$ is the total count rate of all DSRD panels. The weighting factors D are then compared among all DSRD panels using one or more of a number of different estimation techniques, such as maximum likelihood, method of moments, Cramèr-Rao lower bound, and other methods and techniques those familiar with the field will be aware of. Since DSRD panels are exposed to approximately the same amount of background radiation, the interference with the counting statistics can easily be minimized. The localization algorithm can be implemented in the CDPU or in a separate device connected to the CDPU, such as a microprocessor, depending on user requirements.

Figure 13:
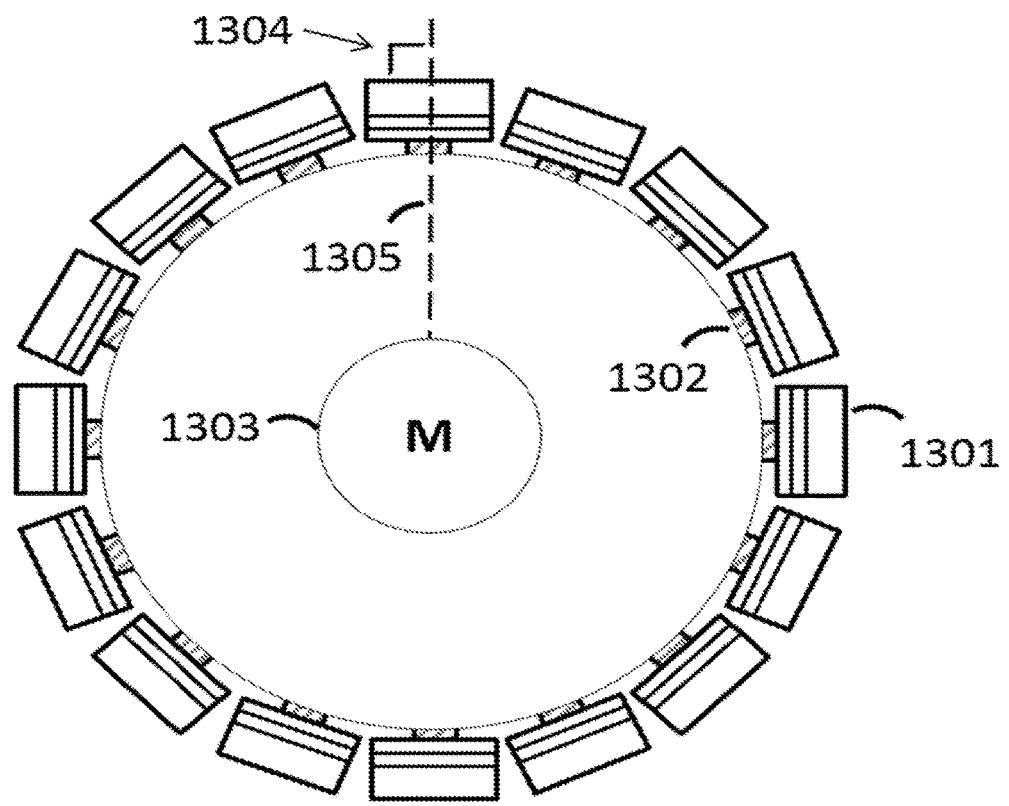
FIG. 13 shows a top-down view of embodiment one of the DSRD at a view angle of 0°.
Figure 14:
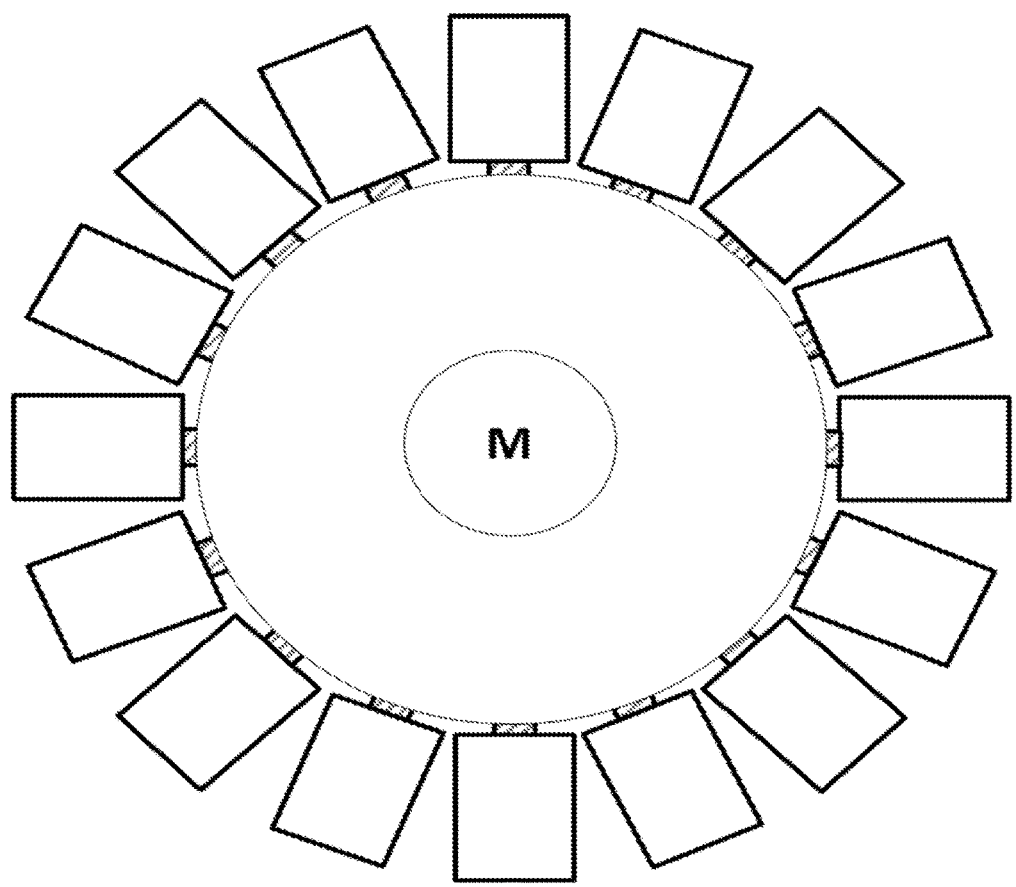
FIG. 14 shows a top-down view of embodiment one of the DSRD at a view angle of 90°.

Top-down views of one design of the DSRD are shown in FIG. 13 and FIG. 14. In both figures, the detection panels 1301, helical gears 1302, and stepper-motor 1303 are shown. In FIG. 13, the DSRD panels are shown with a view-angle of 0° and in FIG. 14 with a view-angle of 90°. Different sizes of detectors 1301 can be used in a given embodiment. However, to maximize the system directional capability, the detectors are rectangular cuboids, with two of the six faces larger than the other four. The angle between the line 1305 perpendicular 1304 to the detector front window and the horizon surface is the view angle 201, 501 shown in FIGS. 2 and 5. This configuration and detector shape afford the DSRD better directional capability as it utilizes the difference in geometric efficiency of the detectors depending on their orientation to the radiation source to generate information on the source direction.

Figure 15:
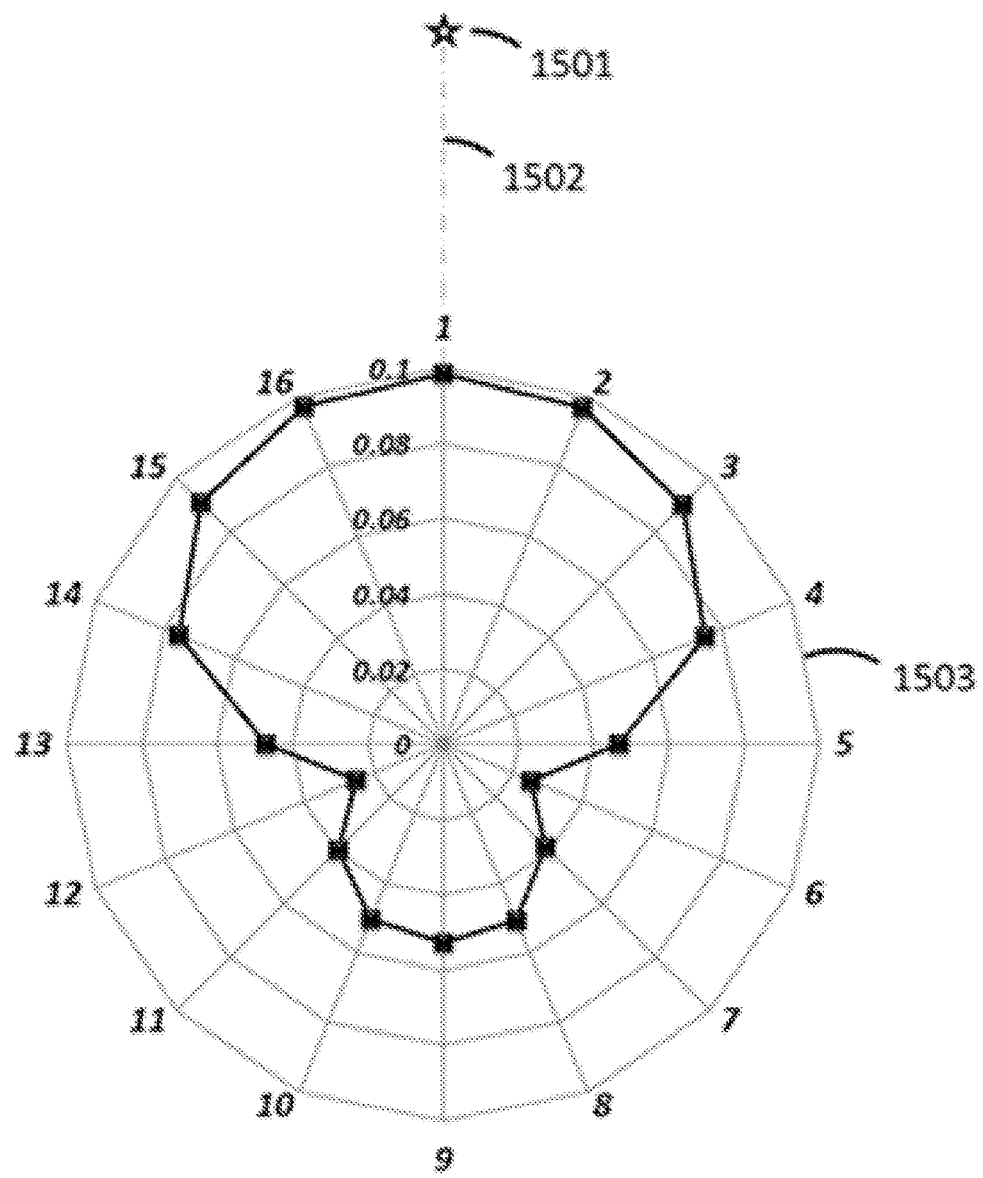
FIG. 15 shows a radar plot illustrating relative count rates from a DSRD with 16 panels and view angle of 0° when a point source of Cesium-137 is positioned at 100 cm from the surface of panel #1. The data was obtained from a Monte Carlo radiation transport modeling.

The results of a Monte Carlo simulation of the DSRD configuration shown in FIG. 13 are shown in FIG. 15. An isotropic Cesium-137 point-source 1501 emitting 662 keV gamma-rays was positioned on the centerline 1305 100 cm from the front face 1502 of DSRD panel #1. Each panel 1301 consisted of one 2.5×1.5×0.8 cm$^3$ BGO scintillation crystal for the purposes of the simulation, with the view angle set to 0°, as in FIG. 13. The count rate ratios of the panels 1503, calculated using Equation 1, are shown in FIG. 15. This figure shows two distinct regions, with panels #6 and #12 marking the boundaries between the regions. The "primary" region includes panels #1 sequentially through #5 and #13 sequentially through #16. The "secondary" region includes panels #7 sequentially through #11. The boundary panels and the panels separated into each region will change based on the direction in which the radiation source is located. The region that each panel falls into described above applies only to the simulation results in FIG. 15.

The panels in the primary region of the DSRD average a higher count rate ratio than those in the secondary region since nothing obstructs their view of the source. The count rate ratio is lower in panels closer to the region boundary. The reason for this effect is a decrease in the solid angle of the isotropic point source subtended by the panels in positions closer to the region boundary. For this reason, the detectors used on the panels have two faces larger than the rest or this effect is not be significant.

The panels in the secondary region of the DSRD average a lower count rate ratio than those in the primary region. The lower average count rate ratio in this region is due to attenuation from the panels in the primary region. X-rays and gamma rays absorbed in the primary region will be removed from the radiation flux that reaches the secondary region. Since a high-Z material is used, this effect is substantial. The panels in the secondary region also show decreasing count rate in panels closer to the region boundary. This effect is due to the changing solid angle of the point source subtended by the panels as their positions change, similar to the panels in the primary region.

The pattern of count rate ratios shown in FIG. 15 is the primary means of determining the most probable source direction. The simulation results shown in this figure are only for the most basic case (a single point source directly in front of one panel), but the principles can be extrapolated to other cases. The algorithm implemented in the CDPU identifies this pattern and determines the most probable source direction based on the orientation of the pattern with respect to the panel numbers.

In at least one of the embodiments, the DSRD is mounted below the main body of an UAV, but can also be mounted above the main body of the UAV depending on space requirements. In any location on the UAV the DSRD is mounted, UAV components that obstruct line-of-sight of the DSRD panels to the ground should be composed of low-atomic number, low-density materials, such as carbon-fiber, in order to decrease the likelihood that a given quantum of radiation from a source will scatter away from the DSRD. The ESRD should be mounted on the lowest point of the UAV main body, including under the DSRD if the DSRD is mounted underneath the main body of the UAV. This ensures that the ESRD has a minimally-unobstructed view of the source once it has been located. The DSRD and ESRD are relatively delicate components and can be protected by some manner of impact-mitigation device, such as an airbag. Finally, the UAV supports position-sensing equipment that enables it to perform simultaneous location and mapping (SLAM) functions as well as to compensate for various atmospheric conditions. This can be accomplished through any combination of infrared sensors, ultrasound sensors, laser rangefinders, optical sensors, gyroscope, accelerometer, radar, and other devices those familiar with the field will be aware of. These sensors are necessary in areas and in situations where GPS may not be available, such as inside buildings, underneath structures, in emergencies, and on battlefields. In these environments, the UAV can maneuver toward the radiation source using any of various methods of SLAM, such as computer vision and dead-reckoning, and does not require pre-programmed waypoints or motion-capture. The UAV will also mount at least one optical sensor that will relay images back to human observers that provide a FPV of the UAV's position and surroundings.

Figure 16:
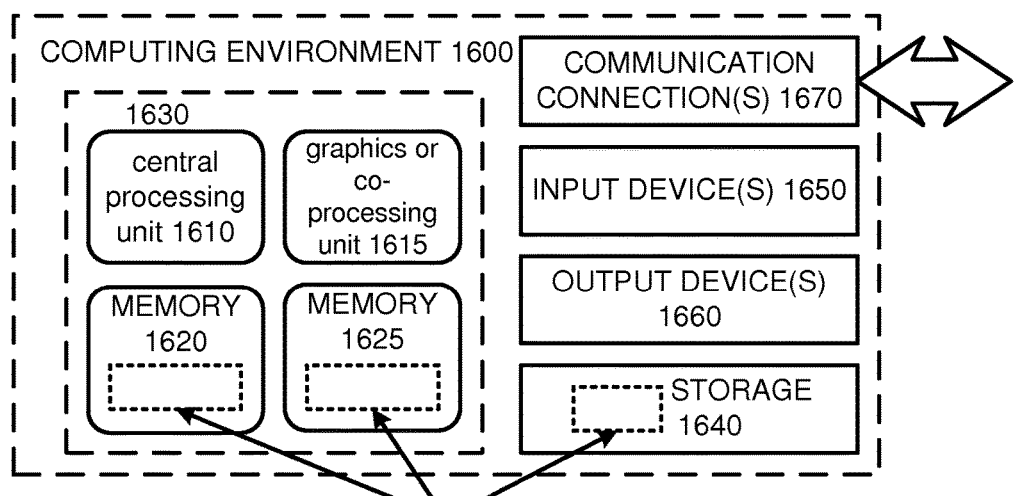
FIG. 16 depicts a generalized example of a suitable computing environment in which the described innovations may be implemented.

FIG. 16 depicts a generalized example of a suitable computing environment 1600 in which the described innovations may be implemented. The computing environment 1600 is not intended to suggest any limitation as to scope of use or functionality, as the innovations may be implemented in diverse general-purpose or special-purpose computing systems. For example, the computing environment 1600 can be any number of a variety of computing devices and can be used with the embodiments described herein.

With reference to FIG. 16, the computing environment 1600 includes one or more processing units 1610, 1615 and memory 1620, 1625. In FIG. 16, this basic configuration 1630 is included within a dashed line. The processing units 1610, 1615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), non-volatile memory (e.g., ROM, EEPROM, flash memory, etc.), or some combination of the two, accessible by the processing unit(s). The memory 1620, 1625 stores software 1680 implementing one or more innovations described herein, in the form of computer-executable instructions suitable for execution by the processing unit(s).

A computing system may have additional features. For example, the computing environment 1600 includes storage 1640, one or more input devices 1650, one or more output devices 1660, and one or more communication connections 1670. An interconnection mechanism (not shown) such as a bus, controller, or network interconnects the components of the computing environment 1600. Typically, operating system software (not shown) provides an operating environment for other software executing in the computing environment 1600, and coordinates activities of the components of the computing environment 1600.

The tangible storage 1640 may be removable or non-removable, and includes magnetic disks, magnetic tapes or cassettes, CD-ROMs, DVDs, or any other medium which can be used to store information in a non-transitory way and which can be accessed within the computing environment 1600. The storage 1640 stores instructions for the software 1680 implementing one or more innovations described herein.

The input device(s) 1650 may be a touch input device such as a keyboard, mouse, pen, or trackball, a voice input device, a scanning device, or another device that provides input to the computing environment 1600. The output device(s) 1660 may be a display, printer, speaker, CD-writer, or another device that provides output from the computing environment 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (PSSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for detection and locating a source of radiation, comprising:
   providing a plurality of radiation detectors mounted to a vehicle;
   comparing count rates amongst the plurality of radiation detectors to determine a direction in which the vehicle should move to locate the source of radiation;
   rotating the plurality of radiation detectors in unison using a common gear so that the plurality of radiation detectors are at a same angle relative to a horizontal plane so as to maximize a detection efficiency for detecting radiation emitted from a source in the vicinity of the vehicle as the vehicle moves towards the source of radiation; and
   determining that the vehicle has reached the source of radiation.

2. The method of claim 1, wherein determining that the vehicle has reached the source of radiation includes detecting that a count rate in each of the plurality of radiation detectors is statistically equal.

3. The method of claim 1, further including measuring the energy of radiation using the plurality of detectors or a separate detector to identify a source of radiation.

4. The method of claim 1, wherein the plurality of detectors are positioned in a circular pattern or other geometric pattern around a central point.

5. The method of claim 1, further including moving the vehicle in a direction associated with a group of the plurality of detectors having the highest count rates.

6. An apparatus for detection and locating a source of radiation, comprising:

a plurality of rotatable detectors positioned on a vehicle, wherein the plurality of rotatable detectors are coupled to a common gear so as to rotate in unison to a common angle; and a controller coupled to the plurality of detectors to determine a direction of the source of radiation based on count rates received from the plurality of detectors and to direct the vehicle on a direction to proceed to locate the source of radiation.

7. The apparatus of claim 6, wherein the plurality of detectors are rotatable from a vertical to a horizontal position.

8. The apparatus of claim 6, further including a detector coupled to circuitry programmed for determining a type of the radiation source.

9. The apparatus of claim 6, wherein the plurality of detectors are positioned in a circular pattern around a frame of the vehicle.

10. The apparatus of claim 6, wherein each of the detectors include scintillator material, a light readout device coupled to the scintillator material and electronics coupled to the light readout device for supplying a digital signal associated with a radiation reading to a central processing unit.

11. A multi-element radiation measurement system, comprising:

a plurality of radiation detection panels arranged in a pattern around a central point with substantially equidistant spacing there between and coupled together so as to rotate in unison to a common angle, the plurality of radiation detection panels for generating radiation event information in response to receiving a flux of radiation emitted from a radiation source;

a controller coupled to the plurality of radiation detection panels for rotating the radiation detection panels in response to receiving the flux of radiation so as to maximize detecting the flux of radiation; and at least one radiation spectrometer device coupled to the controller that provides energy information based on interaction with the flux of radiation emitted from the radiation source so as to identify a type of radiation source or radionuclide.

12. The multi-element radiation measurement system of claim 11, wherein the multi-element radiation measurement system is mounted on a vehicle and the controller is for determining a direction of the radiation source based on the radiation event information.

13. The multi-element radiation measurement system of claim 12, wherein the controller is adapted to move the vehicle automatically in conjunction with other navigational sensors in the direction of the radiation source.

14. The multi-element radiation measurement system of claim 13, wherein the controller is adapted to rotate the plurality of radiation detection panels automatically as the vehicle moves.

15. The multi-element radiation measurement system of claim 11, wherein each of the radiation detection panels include a radiation detector and electronics for supplying a digital signal associated with a radiation reading to the controller.

* * * * *